United States Patent
Thompson

[11] Patent Number: 5,967,769
[45] Date of Patent: Oct. 19, 1999

[54] READY TO USE CAMPFIRE

[75] Inventor: William Thompson, Greer, S.C.

[73] Assignee: Campfire, Inc., Greenville, S.C.

[21] Appl. No.: 08/920,086

[22] Filed: Aug. 26, 1997

[51] Int. Cl.⁶ ................................................ F23D 3/16
[52] U.S. Cl. .......................... 431/288; 431/291; 431/325; 126/59; 126/500; 126/25 B; 44/275; 44/519
[58] Field of Search ................................ 431/288, 289, 431/125, 126, 291, 320, 325; 126/25 R, 59, 266, 267, 262, 500, 43, 25 B; 44/265, 275, 519, 542, 543, 562, 571

[56] References Cited

U.S. PATENT DOCUMENTS

| | | | |
|---|---|---|---|
| 1,285,208 | 11/1918 | Joite | 44/562 |
| 2,488,014 | 11/1949 | Higman | 126/25 R |
| 2,622,017 | 12/1952 | Bramhall et al. | 44/275 |
| 3,124,432 | 3/1964 | Gentry | 44/519 |
| 3,261,346 | 7/1966 | Waddell et al. | 431/291 |
| 3,367,758 | 2/1968 | Ambrose et al. | 431/291 |
| 3,371,659 | 3/1968 | Paspalas | 126/43 |
| 3,427,368 | 2/1969 | Anderson | 44/265 |
| 3,502,068 | 3/1970 | Henson | 126/43 |
| 3,613,658 | 10/1971 | Knowles | 44/275 |
| 3,647,403 | 3/1972 | Davis, Jr. | 44/544 |
| 3,759,675 | 9/1973 | Lazarus et al. | 431/291 |
| 3,797,990 | 3/1974 | Rogers et al. | 431/288 |
| 3,998,922 | 12/1976 | Weiss | 431/289 |
| 4,043,765 | 8/1977 | Tanner | 44/519 |
| 4,110,261 | 8/1978 | Newland | 44/275 |
| 4,272,252 | 6/1981 | Altman | 44/542 |
| 4,654,049 | 3/1987 | Smith, Jr. | 44/543 |
| 4,756,719 | 7/1988 | Saito | 44/265 |
| 4,855,098 | 8/1989 | Taylor | 431/288 |
| 5,226,405 | 7/1993 | Snow | 126/25 B |
| 5,307,799 | 5/1994 | Scarnato et al. | 126/43 |
| 5,584,283 | 12/1996 | Messina | 126/43 |

FOREIGN PATENT DOCUMENTS 1194315  6/1970  United Kingdom .................. 431/291

Primary Examiner—Ira S. Lazarus
Assistant Examiner—Josiah Cocks
Attorney, Agent, or Firm—William D. Lee, Jr.; Cort Flint

[57] ABSTRACT

A portable, contained, fueled, ready-to-use campfire assembly having a fire resistant container with an upwardly facing mouth. The container is filled with a mixture of mineral spirits, paraffin wax and hardwood chips. No additional fuel, mixing, pouring, or lighting is required and a long lasting fire is provided that resists moderate winds, is readily extinguished and does not give out dangerous sparks.

8 Claims, 2 Drawing Sheets

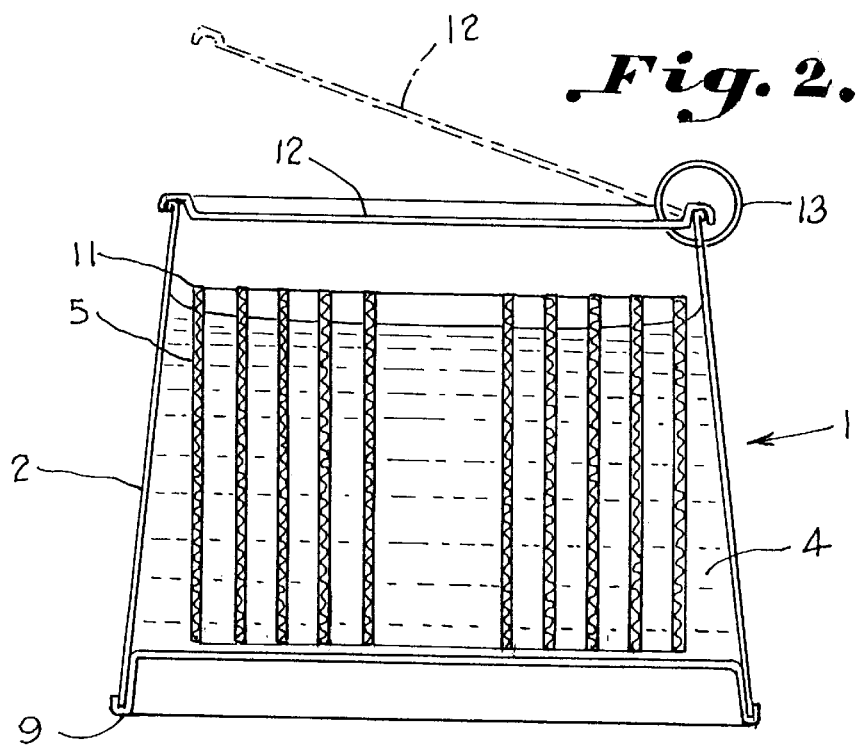
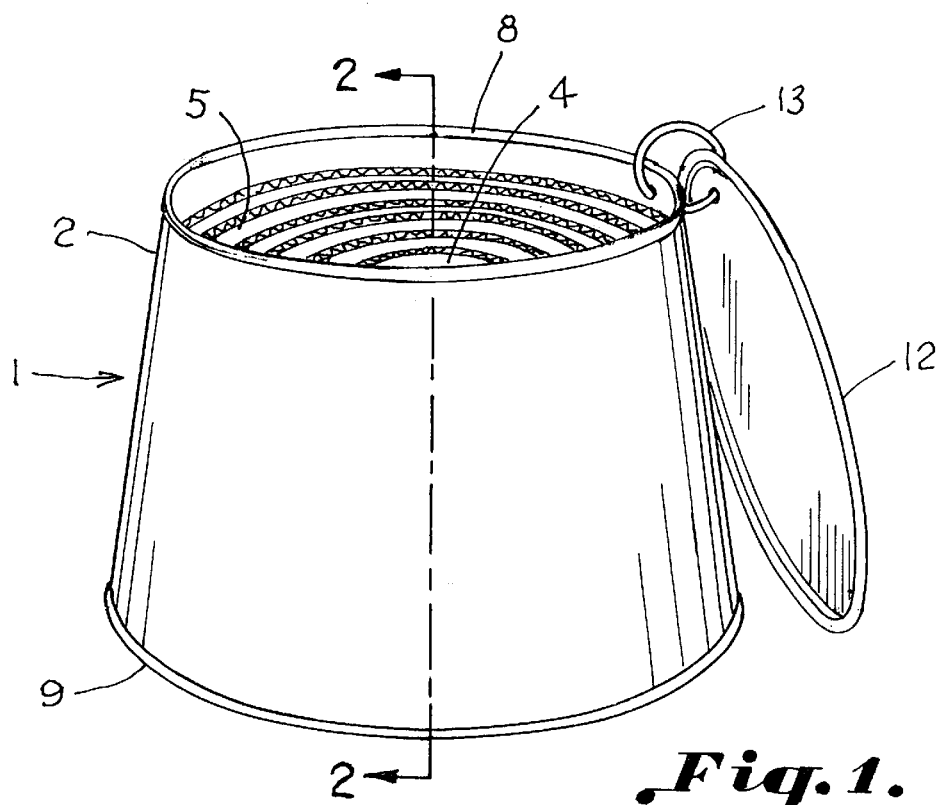

READY TO USE CAMPFIRE

FIELD OF THE INVENTION

This invention relates to a portable, contained, ready-to-use assembly which provides an instant campfire, fireplace burner, cooker or the like which does not require additional fuel nor mixing, pouring, priming, nor set up procedures and which can be lighted to provide relatively long lasting, contained, outdoor fire for heat and light with a minimum of hazards.

BACKGROUND OF THE INVENTION

Each year in the United States and other countries numerous forest fires are inadvertently set off by those who carelessly and improperly make, maintain, and extinguish campfires. Thus, a primary object of the present invention is to provide a campfire which is contained, does not emit dangerous sparks, provides desirable heat, and is readily extinguished.

In the prior art there are numerous portable devices and fuel compositions which are designed to provide a convenient fire without the problem of gathering wood or other fuel and continuously feeding it to the fire. One such fuel is the common firelog which typically is sawdust held together with a wax binder which is extruded and then wrapped in a paper starter. However, the typical firelog is heavy, inconvenient to transport, sometimes difficult to light, and requires a supporting grate or fire stand. It is, therefore, one object of the present invention to provide a relatively lightweight fire assembly which is easy to start and does not require any additional grates or stands or supporting structure.

Another common apparatus in the prior art for providing a portable, relatively quick means of providing a fire is a gas stove or burner. However, these require the transportation of a heavy "bottle" or tank of gas and burner or stove parts, and at least some time and effort in assembling and setting up the burners, tanks, and stove. In addition, besides being bulky, heavy, and time consuming these gas devices are relatively expensive and require regular maintenance to keep them operating satisfactorily. Accordingly, it is another object of the present invention to provide a campfire and cooker which is lightweight, requires no set-up, and is relatively inexpensive.

Another type of portable heat or fire device is the "canned heat" which is an alcohol gel in a can. These often are used as the heat source for chafing dishes or the like where heat with low ash and few obnoxious combustion products is desired within an enclosed area. However, while clean and portable, the alcohol gels do not produce the same heat output, intensity, and ability to remain lighted that is desirable for campfires or cookers. Thus, it is yet another object of the present invention to provide an assembly which produces a flame which has a relatively high heat output and satisfactorily maintains a flame under varied conditions. These and others objects are provided by the invention described below.

The process of making the aforementioned products and devices often requires numerous steps in the production process and expensive extrusion equipment. Therefore, still yet another object of the present invention is to provide a simple and economical method of producing the assembly of the present invention.

SUMMARY OF THE INVENTION

It has been surprisingly discovered that a novel combination of a fire resistant portable container filled with a unique combustible composition will accomplish the objects set forth above.

In one aspect, the invention is a portable, fueled, assembly for providing an instant and ready-to-use campfire, fireplace burner, or cooker which comprises a portable, heat and flame resistant container which has an upwardly facing open mouth that is configured so that it can be placed in a stable position on the ground or a base support surface or structure. The container is filled with a combustible composition which will support a flame for an extended period of time. In one embodiment, the composition is disposed in the container so that a sheet-like wick can be embedded in and extend above the upper surface of the composition. The composition preferably comprises about 5% to 15% by weight of mineral spirits, about 50% to 85% of paraffin wax, and up to 40% and preferably about 15% to 35% combustible cellulose filler so that when the wick is lighted by a match or other means a useful fire is produced across the surface of the composition which will give light and substantial warmth. Preferably the container is made of a fire and heat resistant metal and is provided with a handle or other carrying means. The wick preferably is a formed from a paper material such as kraft paper or it may be a woven material of cotton fiber or the like.

In another aspect, the container is of metal and is in an inverted truncated cone shape wherein the base is the smaller circular surface or side and the open mouth is the larger circular side. The container may be provided with a lower rim which extends below the closed bottom and provides support for the container. This lower portion may be provided with orifices for airflow. Such a configuration provides a stable support for the container on a wide variety of surfaces.

In yet another aspect, the present invention is a combustible fuel composition for portable campfire assemblies, fireplace burners, cookers, and the like which comprises a major portion of a paraffin wax which is present in about 50% to 80% by weight and minor portions comprise mineral spirits and cellulose filler. The mineral spirits are a combustible hydrocarbon napthenic solvent and comprise from about 5% to 15% by weight of the composition and the cellulose filler is preferably hardwood chips comprising from about 15% to 35% by weight. The hardwood chips may be hickory, oak, maple, cherry, pecan, walnut, or like chips which burn with a desirable heat intensity and emit a pleasant aroma. Soft wood chips may be also blended in with the cellulose fiber mix. Sawdust could be used but chips are preferable.

In yet another aspect, the present invention is a method of making a portable, fueled, assembly for an instant, contained campfire which comprises the steps of providing a container with an open upwardly facing mouth and placing wood chips in mulch form in the container and filling the container with a mix of melted paraffin wax and mineral spirits. The hardwood chips being lighter or less dense will float up into the melt before it solidifies, thus, eliminating the need for any mixing or stirring. The sheet-like wick material is inserted into the upper surface of the mix and becomes impregnated with the wax mixture before it solidifies. At least an edge of the mix is exposed so that it can be lighted.

In still another aspect, the present invention is a new and of a combination of ingredients to produce a novel, portable, ready-to-use campfire.

DESCRIPTION OF THE DRAWINGS

The invention set forth above and which will be described in greater detail hereinafter can be better appreciated by reference to the drawings in which:

FIG. 1 is a perspective view of a preferred container which contains a wick and the combustible composition of invention and which has been ignited;

FIG. 2 is a vertical cross-sectional view of the container of FIG. 1 showing the arrangement of the wick, composition, and container.

DETAILED DESCRIPTION

Figure 3:
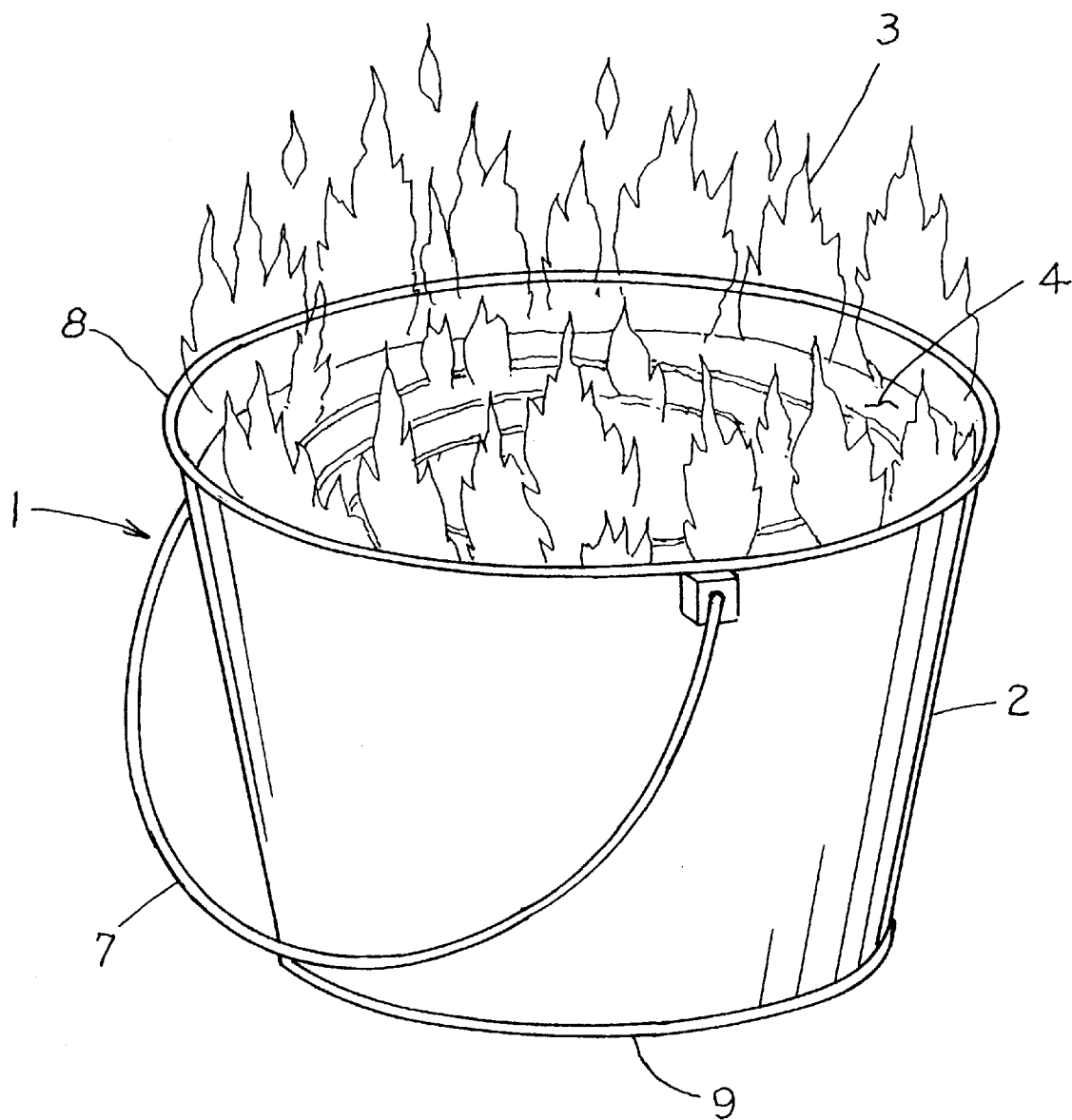
FIG. 3 is a cross-sectional view similar to FIG. 2 except that the container is a right circular cylinder and the wick is placed in an alternate position and the bottom of the container is provided with an extended rim.

Turning now to FIG. 1, the portable assembly 1 of the present invention is shown in perspective and it comprises container 2 with carrying means or handle 7. The assembly which is the portable or ready-to-use, contained campfire is shown in FIG. 1 after it has been ignited so that flames 3 rise as composition 4 burns. A steady flame height from 8" to 12" or more can be achieved. In this embodiment of the invention, the container 2 is a truncated cone with the open mouth 8 being circular and having a diameter of about 7" in the preferred embodiment shown. This diameter may practically vary from as low as 4" or 5" to as wide as 12" to 15" or more. The limits on size are a matter of choice for the size of the fire and desired burning time. The support surface or support means 9 also being circular has a diameter in this preferred embodiment of about 4 ½" although this can vary from 3" or lower to 12" or greater. The distance between the opening 8 and support surface 9 which represents the height of the container in this embodiment is about 4 ¾" but can be between 3" or lower to 8" to 12" or greater.

Looking now at FIG. 2, the vertical cross-section of the assembly is shown. The wick 5 is adjacent to the interior wall surface 6 and extends above and over the upper surface of the composition 4 and is partially embedded in the surface with at least an edge in a position where it may be readily lighted with a match. This wick 5 may be kraft paper or a woven fabric. The composition fills the container to within about 1" of the rim of the mouth 8 in the embodiment being described. This volume of the composition 4 will provide a useful fire for up to five hours. The sheet-like wick forms the function of lighting the composition across the entire upper surface of the composition.

In FIG. 3, an alternate positioning of the wick 15 is shown as alternate recessed bottom or alternate support means 19 carried by the support rim 12. This alternate embodiment shows the container 10 in the shape of a right circular cylinder. Other shapes can be made within the scope of the invention, namely, bowl shapes with legs, cylinders or truncated cone or bucket shapes, or rectangler parallelpiped forms. All then configurations are within the scope of the invention.

The process for making the assembly according to the present invention comprises the steps of providing a container which is flame and heat resistant. Typically metal is the most readily available and steel is generally the lowest cost suitable metallic material. Steel, the type that is commonly used in paint buckets, fruit juice and coffee cans and the like, is preferred because of its availability and low cost. This steel is usually low carbon type and its cost is such that the container can be readily disposed of after the composition has completely burned up. Disposal presents no environmental hazard and these containers may be placed in the trash disposal receptacles found in parks and other outdoor areas.

The next step in the process of making the ready-to-use campfire assembly of the present invention requires the preparation of the combustible composition. The composition comprises a major portion of the paraffin wax which is preferably a petroleum derived hydrocarbon wax which may be described as a white crude scale wax preferably having a melt temperature range from about 117° F. to about 130° F. A particularly suitable wax is 6433 wax from the National Wax Division of the Dussek Campbell Company.

The mineral spirits or naptha which is an aliphatic hydrocarbon fraction of petroleum evolved in the distillation range of about 150° C. to about 200° C. A particularly suitable form is the paraffinic napthlanic solvent sold by Lamplight Farms of Menomonee Falls, Wis. under the brand name "Lamplight Farms Lamp Oil" which has a specific gravity at 60° F. of about 0.806.

The third ingredient of the composition, which is preferred but may be optional, is wood chips which are preferably hardwood chips of oak, hickory, maple, cherry, walnut, or the like. Sawdust or mulch from any one of these woods can be used and also pine chips or pine sawdust or other soft wood could be used. The chips can be relatively fine ground or ¹⁄₁₆" to 2" to 3" in length, ¹⁄₁₆" to ½" in width, and ¹⁄₁₆" to 1 ½" to 3" in height. While it is a desirable feature of the invention and within its scope, the composition of the invention will perform its function satisfactorily without wood chips and will burn with the mineral spirits/wax composition.

The step in the process which requires the positioning of the wick within the container can be accomplished in either before or after the melt is poured into the container. The wick is preferably sheet-like and in one embodiment is annular in shape so that it can line the walls of the container. As mentioned above, paper, such as kraft paper, may be used or a woven fabric of cotton or other natural fiber may be used for the wick. Once the annular wick is positioned in the container the composition is then poured in to fill the container to within about 1" of the upper rim of the container. Sufficient wick material is left so that it can be folded over the upper surface of the composition so that the edge of the wick can be readily lighted by a match. The wick can be located in other positions spaced apart from the wall surface 8 as shown in FIG. 3. The important function of the wick is that it lights the entire upper surface of the composition. A cord or string-like wick of the typical candle may have a tendency to burn only in a localized area around the string-like wick and not spread across the composition surface. Thus, while not as satisfactory, to light the composition without the use of a wick, crumpled paper may be pressed against the entire surface and lighted with a match to ignite the composition.

Continuing with the process, the paraffin wax is melted and the mineral spirits is blended there within a preferred ratio of about 1 ounce of mineral spirits to about 1 pound of wax or about 7% by volume. Since the densities or specific gravities are below 1.0 and not to different, volume and weight percentages tend to be relatively close with these materials. The wood chips can be preferably placed into the container prior to pouring the melt into the container or the chips can be mixed or stirred into the melt after pouring and before it solidifies. As mentioned above, it is desirable to have a sheet-like wick inserted which can be lighted from one edge above the surface of the composition so that the flame will spread evenly and burn evenly across the surface of the composition.

In the preferred method the chips in particulate or mulch form are first placed in the container and then the melted paraffin/mineral spirits blend is poured into the container.

The wood chips are less dense than the blend and rise and float within the blend resulting in a substantially uniform distribution when the melt solidifies.

In an alternate process an annular wick can be provided which is in the form of an hollow cylinder which can be inserted into the container and lines the wall of the container prior to pouring in the paraffin wax or the annular wick can be inserted into the melt before it solidifies and be spaced apart from the walls.

In another alternate embodiment which is prepared by pouring the melt according to the foregoing description and inserting therein the an annular paper wick into the melt to a depth to 1" to 3" or 4" and then folding the portion which extends above the surface downwardly to impregnate at least a portion of the wick material with the melt. Thus, a substantial portion of the upper surface of the composition is covered by the sheet-like wick material. Lighting an edge of the wick then provides for a quick start-up of the fire where the flame covers the entire upper surface of the composition.

Best Mode

The best mode of the invention for which preferred embodiments have been presented above comprises a container of the shape shown in FIG. 2 having a mouth 8 diameter of 8", a height of about 7" of steel construction. The composition comprises 7% of the aforementioned "lamp oil", 65% of the aforementioned "scale wax", and 28% hardwood chips in mulch form, all percentages being by volume. The container is filled to the brim and has a kraft paper wick 5 as shown in FIG. 2 with the wick having been pressed into the surface before the composition has solidified so it has absorbed some of the composition. The container is filled about ¼" below the brim and the assembly weighs approximately 5 ½ pounds and will burn up to eight hours.

The campfire assembly, when lighted, provides a flame which will resist being blown out by moderate to even relatively strong winds. Also, the fire can be snuffed out by covering the mouth of the container with any relatively flame resistant material such as metal or wood sheet or wet canvas. The flame may be readily rekindled by crumpling a piece of paper, placing it on and pressing it against the composition surface and lighting it.

Many other embodiment configurations of the present invention will become apparent to those skilled in the art upon reading this disclosure. The scope of the invention is only limited by the claims appended here to.

What is claimed is:

1. A portable, fueled, assembly for providing an instant campfire, fireplace burner, or cooker comprising:

a) a portable, substantially hollow, heat and flame resistant container having at least one interior wall surface, said container being configured to have a base so that it can be placed in a stable position on the ground or a base support surface and having an open, upwardly facing mouth through which flame can rise;

b) a combustible composition capable of supporting combustion for an extended period of time disposed in said container, said composition comprising by weight about 5% to 15% mineral spirits, about 50% to 85% paraffin wax, and about 0% to 40% combustible cellulose filler;

c) a wick of generally sheet-like configuration at least partially embedded in said composition having a portion thereof extending above the upper surface of the said composition, said wick extending a substantial distance across said surface, and said wick being accessible through said upwardly facing mouth, and whereby when said wick is lighted a useful fire is produced across the upper surface of said composition in said container which will burn for an extended period.

2. The assembly of claim 1 wherein the container comprises fire resistant metal selected from the group consisting of generally right circular cylinders and generally truncated cones shape with a smaller circular surface forming the bottom of the container and a larger circular surface being open to provide said upwardly facing mouth.

3. The assembly of claim 1 wherein said combustible composition is a pre-formed refill.

4. The assembly of claim 1 wherein said wick comprises paper.

5. The assembly of claim 1 wherein said wick is embedded in said composition and is spaced apart from said wall.

6. The assembly of claim 1 wherein said cellulose filler comprises hardwood chips.

7. The assembly of claim 1 wherein said wick comprises paper, said cellulose filler comprises hardwood chips, and said composition comprises, by volume, about 7% mineral spirits, about 65% paraffin wax and about 28% hardwood chips.

8. The assembly of claim 1 wherein said wick is of generally annular form.

* * * * *